J. M. ERVIN.
DIRIGIBLE HEADLIGHT.
APPLICATION FILED JAN. 2, 1914.

1,179,169.

Patented Apr. 11, 1916.
2 SHEETS—SHEET 1.

Inventor
James Mathew Ervin,

Witnesses

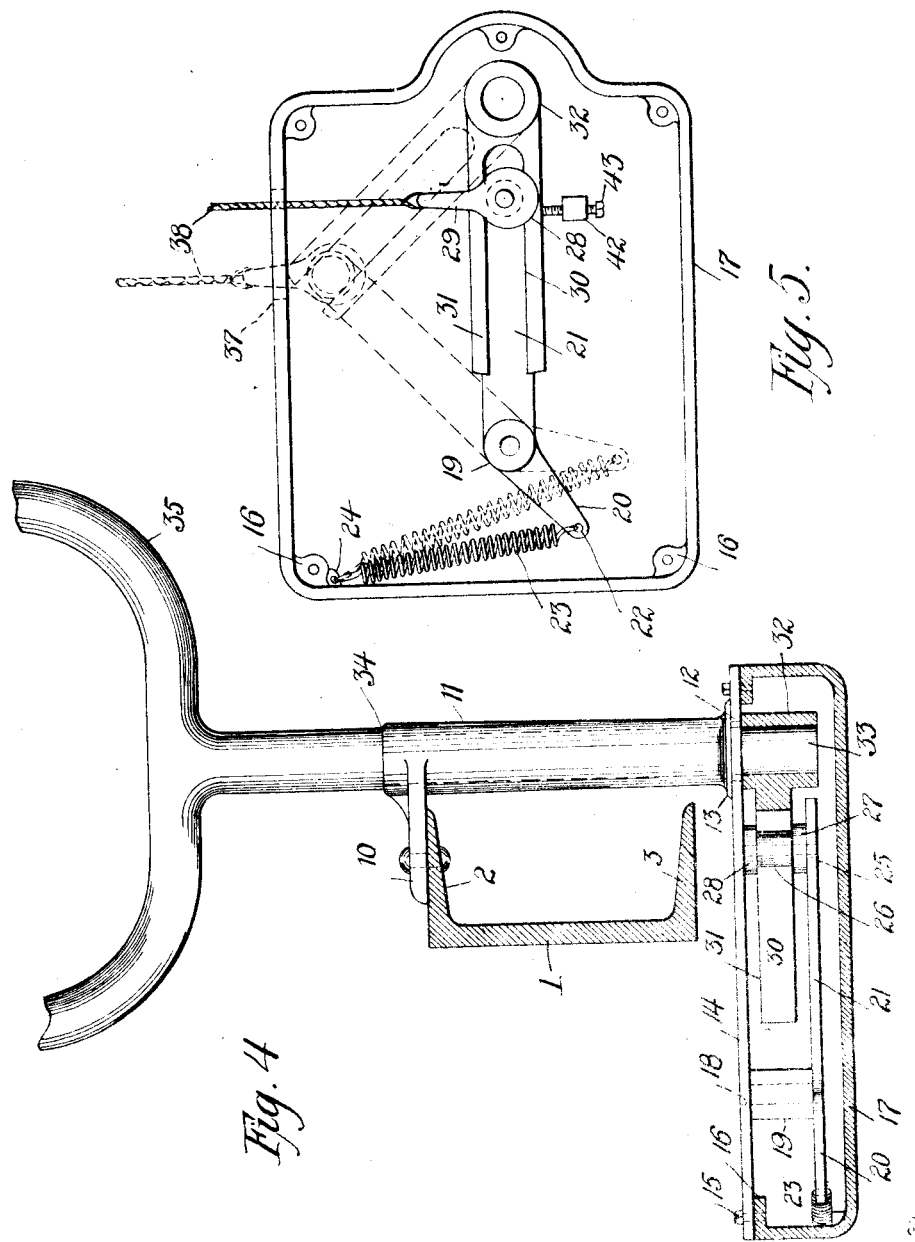

UNITED STATES PATENT OFFICE.

JAMES MATHEW ERVIN, OF DETROIT, MICHIGAN.

DIRIGIBLE HEADLIGHT.

1,179,169.  Specification of Letters Patent.  Patented Apr. 11, 1916.

Application filed January 2, 1914. Serial No. 810,045.

*To all whom it may concern:*

Be it known that I, JAMES MATHEW ERVIN, a citizen of the United States of America, residing at Detroit, in the county of Wayne and State of Michigan, have invented certain new and useful Improvements in Dirigible Headlights, of which the following is a specification, reference being had therein to the accompanying drawings.

This invention relates to a lamp shifting mechanism for vehicles of that type commonly styled "dirigible lamps", wherein mechanism is actuated from a vehicle for turning or swinging lamp or lantern holders simultaneous with the steering wheels of the vehicle.

The primary object of my invention is to provide simple and effective means, as hereinafter set forth, for instantly turning or swinging lamps or lanterns in unison with the steering wheels of the vehicle, whereby rays of light will be immediately cast in the path to be traveled by the vehicle.

A further object of this invention is to provide automatically independently actuated lamps or lanterns, one of which remains straight ahead while the other turns rays of light in the curved path traveled by the vehicle until the vehicle assumes practically a straight path, at which time the shifted lamp or lantern assumes a position straight ahead and coöperates with the other lamp or lantern in illuminating the path of travel.

With the above and other objects in view, the invention resides in the novel construction, combination and arrangement of parts to be hereinafter specifically described and then claimed.

Reference will now be had to the drawings, wherein—

Figure 1:
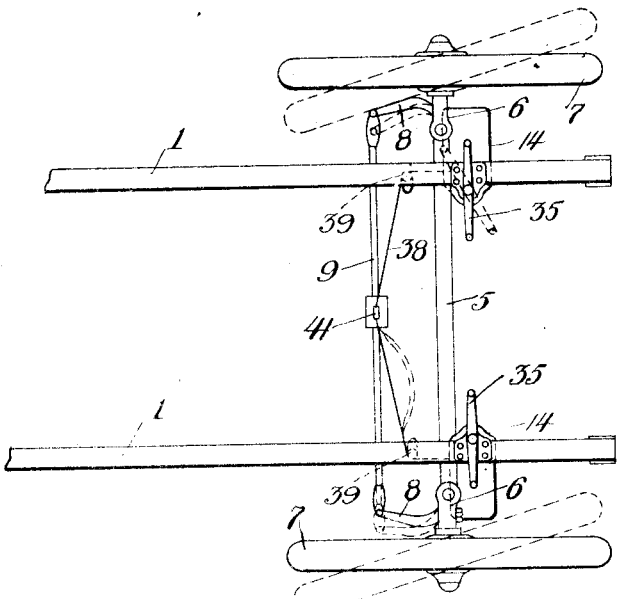
Figure 2:
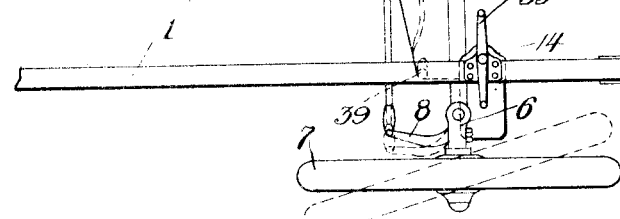
Figure 3:
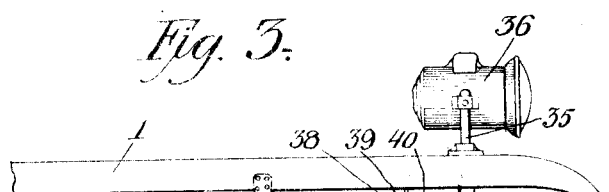
Figure 6:
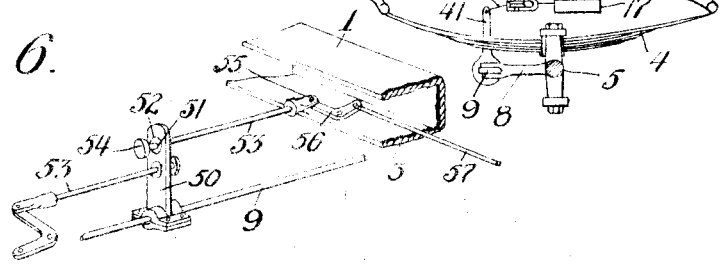

Figure 1 is a plan of a portion of a vehicle provided with the lamp shifting mechanism, showing by dotted lines one of the lamps or lanterns in a shifted position. Fig. 2 is an enlarged perspective view of a bifurcated crank adapted to form part of the mechanism; Fig. 3 is a side elevation of the lamp shifting mechanism as applied to a portion of a vehicle; Fig. 4 is a longitudinal sectional view of a portion of the mechanism, Fig. 5 is a plan of the same. Fig. 6 is a perspective view illustrating a modified form of connection between the steering gear and the lamp shifting mechanism.

In the drawings, 1 denotes the side frames of a vehicle, which are preferably made of channel bars having lateral flanges 2 and 3. The forward ends of the frames 1 are supported by springs 4 relatively to an axle 5, said axle having the ordinary knuckles 6 for steering wheels 7. The knuckles 6 are provided with cranks 8 pivotally connected together by a reach rod 9 and this rod, together with the elements 1 to 8 inclusive, are of the ordinary and well known type forming parts of motor driven vehicles.

Riveted or otherwise connected to the lateral flange 2 of each frame 1 is a bracket 10 carried by the upper end of a vertical tubular bearing 11 preferably arranged at the inner side of the frame 1 and extending below the flange 3 of said frame. The lower end of the bearing 11 is reduced, as at 12 and provided with an annular flange 13, said flange being removed from the end of the bearing, whereby a cover plate 14 can be mounted upon the reduced end 12 of the bearing, against the flange 13, and welded or otherwise secured thereto, whereby the cover plate 14 will form a part of the bearing 11 and be supported thereby. The cover plate 14 is substantially rectangular in plan and connected to the edges of said cover plate, by screws 15 or other fastening means, are inwardly projecting apertured lugs 16 carried by the upper edge of a casing 17. The casing 17 is flat and extends under the flange 3 of the frame 1 at approximately right angles thereto.

The cover plate 14, adjacent to the outer end thereof, has a depending stud 18 and pivotally mounted upon said stud is the barrel 19 of a bell crank having a short arm 20 and a long arm 21. The short arm 20 is connected, as at 22, to a coiled retractile spring 23, said spring having the opposite end thereof connected to a post or hold fast device 24, carried by the bottom of the casing 17.

The long arm 21 of the bell crank extends longitudinally of the casing 17 and has the ends thereof provided with a post 25. Revolubly mounted upon the post and resting upon the arm 21 is a spool or roller 26 provided with peripheral flanges 27 and 28. The flange 28 has an integral lateral apertured extension 29, the purpose of which will hereinafter appear. The spool or roller 26 engages in the bifurcation or slot 30 of a crank 31 forming part of a hub 32 mounted upon the lower end of a spindle 33 that is revolubly supported within the bearing 11. The spindle 33 has the upper end thereof provided with an annular shoulder 34 resting upon the upper end of the bearing 11 and supporting said spindle within the bearing. The upper end of the spindle terminates in oppositely disposed brackets 35 adapted to support a lamp or lantern 36.

The rear side walls of the casings 17 are provided with openings 37 and extending through said openings are cables 38 which are connected to the apertured lateral extensions 29 of the spools or rollers 26. The cables 38 extend rearwardly over pivoted sheaves 39 supported by the flanges 3 of the frames 1. The sheaves 39 are provided with guards 40 whereby the cables 38 cannot become accidentally displaced relatively to said sheaves especially when one of said cables is slack. The ends of the cables are attached to an upright 41, carried by the reach rod 9 intermediate the ends thereof.

The bottom of the casing 17 has a post 42 provided with a screw 43 and this screw engages the crank 31 and limits the movement of said crank in one direction. The crank is normally held in engagement with the screw by the tension of the spring 23 and with said crank longitudinally of the casing, the lamp bracket is held in a straight ahead position.

In operation. I will assume that movement is imparted to the reach rod 9 whereby the wheels 7 are shifted to the position indicated by dotted lines in Fig. 1. One of the cables 38 is pulled upon while the other is allowed to become slack, as indicated by dotted lines in Fig. 1, and the cable that is pulled upon immediately shifts the bell crank and the crank of the spindle 33.

By reference to Fig. 5, it will be observed that the spool or roller 26 travels outwardly in the bifurcation or slot 30 of the crank 31, consequently the spindle 33 is partially rotated in the bearing 11 and the brackets 35 shifted to position the lamp or lantern thereof at an angle to the longitudinal axis of the vehicle or at right angles to the position assumed by the steering wheels 7. The rays of light will therefore be cast in the path to be traveled by the steering wheel and while this is being accomplished by one lamp or lantern, the other lamp or lantern is held straight ahead by the spring 23, which prevents the mechanism associated with the slack cable from accidental shifting. When the steering wheels 7 are placed in parallelism with the longitudinal axis of a vehicle the retractile spring 23 of the actuated lamp or lantern immediately restores said lamp or lantern to its normal position, and when either of the lamps or lanterns is shifted, the spools or rollers 26 reduce the friction to a minimum between the bell crank and the cranks 31 of the lamp or lantern spindles.

In Fig. 6 of the drawing there is illustrated a rigid connection between the steering gear and the lamp shifting mechanism. The reach rod 9 has an upright 50 clamped thereon and said upright has openings 51 with the end walls thereof beveled, as at 52. Extending through the openings 51 are rods 53 having the inner ends thereof provided with heads 54 adapted to be engaged by the upright 50. The outer ends of the rods 53 are pivotally connected, as at 55 to horizontal bell cranks 56 pivotally mounted in the frames 1. The bell cranks 56 are pivotally connected to rods 57 adapted to extend into the casing 17 and be pivotally connected to the apertured extensions within said casing, in lieu of the cables. By this construction it will be observed that the rods 53 can be alternately actuated or it is possible to repeatedly actuate one rod independent of the other. The several openings 51 permit of a rocking movement of the upright 50 relatively to the rods 53, consequently there is sufficient flexibility in the connections to permit of the frames 1 shifting relatively to the axle of the vehicle.

A lamp shifting mechanism in accordance with this invention possesses the following advantages:

First, the flexible connection between the steering gear and the lamp or lantern actuated mechanism prevents jars and vibration set up by the axle 5 from injuring the lamp or lantern shifting mechanism or retarding its actuation. This is accomplished by using the cables 38, although in some instances other connections can be resorted to.

Second, the lamp shifting mechanism is free from any attention on the part of the operator of the vehicle, if not requiring any special hand or foot levers to swing the lamps or lanterns in a desired direction. This is accomplished by connecting the actuating mechanism to the reach rod 9.

Third, a positive and quick action is obtained by using short cranks in connection with the spindles of the lamps or lanterns. I attach considerable importance to the novel construction of the actuating means as a lamp or lantern is instantly shifted by a slight movement of the reach rod 9.

Fourth, by providing independently operated lamps or lanterns, I am enabled to maintain a straight ahead danger signal while the other lamp or lantern illuminates the path to be traveled by the vehicle. This is essential when traveling curved and sinuous roads and contributes to the safety of the occupants of the vehicle.

What I claim is:—

1. In a lamp shifting mechanism for vehicles, the combination with frames, and a steering gear, of vertical bearings carried by the inner side of said frames, casings secured to lower ends of said bearings, lamps having spindles rotatably mounted in said bearings, bifurcated cranks carried by the lower ends of said spindles, bell cranks arranged within said casing and engaging the cranks of said spindles, and means connecting said bell cranks and said steering gears whereby said bell cranks can be independently shifted to impart movement to the spindles of said lamps.

2. In a lamp shifting mechanism for vehicles, the combination with frames, and a steering gear, of lamp spindles rotatably supported by said frames, bifurcated cranks carried by said spindles, pivoted bell cranks engaging the cranks of said spindles, and means connecting said bell cranks and said steering gear whereby said bell cranks can be independently actuated by a movement of said steering gear.

3. In a lamp shifting mechanism for vehicles, the combination with frames, and a steering gear, of bearings carried by said frames, lamps having spindles rotatably mounted in said bearings, cranks carried by said spindles, pivoted bell cranks engaging the cranks of said spindles, and flexible connections between said steering gear and said bell cranks whereby said bell cranks can be independently operated through the medium of said steering gear.

4. In a lamp shifting mechanism for vehicles, the combination with a steering gear and lamps having spindles rotatably supported adjacent to said steering gear, of cranks carried by said spindles, pivoted bell cranks engaging the cranks of said spindles, and a flexible connection between said steering gear and said bell cranks whereby said bell cranks can be independently operated.

5. In a lamp shifting mechanism for vehicles, the combination with bearings, and lamp brackets having spindles rotatably mounted in said bearings, of bifurcated cranks carried by said spindles, bell cranks pivotally mounted adjacent to said bifurcated cranks, flanged rollers carried by said bell cranks and engaging in the bifurcation of the first mentioned cranks, and means connected to said bell cranks whereby said spindles can be independently rotated.

6. In a lamp shifting mechanism for vehicles, the combination with a steering gear, vertical bearings, and lamp brackets having spindles rotatably mounted in said bearings, of casings carried by said bearings, cranks carried by said spindles within said casings, means actuated by said steering gear and housed within said casings for imparting movement to the cranks of said spindles.

7. In a lamp shifting mechanism for vehicles, the combination with a steering gear, vertical bearings, and lamp brackets having spindles rotatably mounted in said bearings, of casings carried by said bearings, cranks carried by said spindles within said casings, means actuated by said steering gear and housed within said casings for imparting movement to the cranks of said spindles, and means within said casings for holding said lamp brackets in a normally straight ahead position.

8. In a lamp shifting mechanism for vehicles, bearings, lamp brackets having spindles rotatably mounted in said bearings, casings carried by said bearings and inclosing the lower ends of said spindles, cranks carried by said spindles within said casings, and flexible means entering said casings and adapted to independently shift said spindles.

9. In a lamp shifting mechanism for vehicles, the combination with a steering gear, of bearings in proximity thereto, lamp brackets having spindles rotatably mounted in said bearings, casings carried by the lower ends of said bearings and inclosing the ends of said spindles, cranks carried by said spindles within said casings, flexible means entering said casings for independently moving said spindles, and means housed within said casings for holding said lamp brackets normally in a straight ahead position.

10. In a lamp shifting mechanism for vehicles, casings, lamp brackets having the spindles extending into said casings, cranks carried by said spindles within said casings, bell cranks pivotally mounted in said casings and adapted to impart movement to the cranks of said spindles and flexible means entering said casings and adapted to independently actuate the bell cranks therein.

11. In a lamp shifting mechanism for vehicles, the combination with frames, and a steering gear, of vertical tubular bearings supported by said frames, lamp brackets having spindles rotatably mounted in said bearings, casings inclosing the ends of said spindles, bifurcated cranks carried by said spindles within said casings, spring held pivoted bell cranks within said casings and adapted to impart movement to the cranks of said spindles, and cables connecting said steering mechanism and said bell cranks whereby movement can be independently imparted to the spindles of said lamp brackets.

In testimony whereof I affix my signature, in presence of two witnesses.

JAMES MATHEW ERVIN.

Witnesses:
 HIRAM HESS,
 KITTIE ERVIN.